Patented Nov. 9, 1943

2,333,919

UNITED STATES PATENT OFFICE 2,333,919

DETERGENT PAPER TOWEL

Marcellus T. Flaxman, Inglewood, Calif., assignor to Union Oil Company of California, Los Angeles, Calif., a corporation of California No Drawing. Application December 30, 1940, Serial No. 372,356

8 Claims. (Cl. 252—91)

This invention relates to treated fabrics especially adapted to glass cleaning, and particularly to the cleaning of automobile windshields.

According to a preferred form of the invention so-called paper towels are employed for glass cleaning purposes, and these are treated with a solution of tetrapotassium or preferably tetrasodium pyrophosphate. In addition the paper towels may be dyed, or they may be treated to reduce linting, and in some instances they may be treated with a composition which acts both as a dye and as a lint retarder. Again, this composition may contain a solution of the tetrasodium or tetrapotassium pyrophosphate, or the towel may be first treated with the dyeing or lint-retarding preparation and then treated with the indicated phosphate.

In addition to treated paper towels, the invention includes also such treatment of cotton towels, or towels of other appropriate fabrics which will adequately absorb the composition or solution applied in the treating operations.

An important object of the invention is to leave the glass surface of a windshield in such condition that, when the windshield wiper is passed across the glass surface as in the case of removing either fog or rain, an even, transparent water film will remain so that vision through the windshield will not be obscured or obstructed. Heretofore, in the use of many glass cleaning compositions, a sort of film or haze (either continuous or spotty) which has often developed on the glass surface during travel or from rain spots or streaks, has not been removed by the glass cleaner. As a result, when rain or fog accumulated while traveling which necessitated the use of the windshield wiper, the glass surface was left in a hazy or clouded, smeared, spotted, or streaked condition which in many instances so obscured vision as to make driving unsafe. This has existed entirely apart from the presence of dust which could initially cause a muddy film. On the other hand, when the glass surface is thoroughly and completely cleaned, the passage of the wiper across the glass surface when wet either by rain or dog, results in a smooth, even, water film which does not materially interfere with the view through the windshield.

I have found that where windshields are cleaned with materials which are fairly strongly alkaline, return or reformation of the mentioned film or haze is rather prompt. Also apparently one of the film formers which causes the most difficulty is an alkaline decomposition product resulting from the action of the elements upon the glass of the windows or windshields. The cleaner should be such as to remove this film so completely that it no longer remains and to leave the glass surface in such a condition that it resists early reformation of such a film.

Treated towels of the present invention meet these requirements. They remove the film or haze when used on wet windows or windshields. Their use overcomes the development of haze, streaky, or cloudy effects which have commonly occurred heretofore, and possesses the characteristic of not developing hazing following cleaning of the windshield and of not leaving haze-forming or other residual materials on the glass after the windshield is cleaned and wiped dry.

I have discovered that when the glass surface is cleaned with a weak water solution especially of the tetrasodium pyrophosphate, all these desirable results are obtained. Such a solution contains from 0.02% to 0.1% and preferably not over 0.15% of the phosphate. This phosphate has the property of removing such film, and at the same time does not act to affect the glass or result in early reformation or restoration of haze or film. Desirably such a water solution would also contain from about 20% to about 50% of isopropyl alcohol.

When a paper towel, according to this invention, is impregnated with a weak water solution of tetrasodium pyrophosphate, for example a 2% solution to leave about 0.02% to 0.05% residual phosphate in the towel, the dried towel may subsequently be used very efficiently for glass cleaning purposes merely by spraying the glass with water or with any appropriate water solution or water and alcohol solution (e. g. water with 20% to 50% isopropyl alcohol or ethyl alcohol or other lower aliphatic alcohol), and then wiping the surface clean and dry with the pyrophosphate-treated paper towel. The water on the glass serves to dissolve a sufficient proportion of the pyrophosphate contained in the paper and results in all of the desirable cleaning properties of the phosphate being released at the wet glass surface. The sodium salt is preferred to the potassium salt because the latter is slower in action.

The mode of applying the indicated pyrophosphate to the paper is not important. Any suitable method may be employed. The paper after its manufacture may be sprayed with a suitable solution from one or both sides. The solution may have any strength that will leave in the paper between about 0.005% and 0.2% of the phosphate. In any event the object is that the paper shall contain ordinarily between about 0.01% and 0.1% of the phosphate itself. Excess proportions of the phosphate produce no apparent advantage, and also tend to hasten reformation of the objectionable haze or film mentioned.

Obviously, the smaller the tendency of the paper to lint in use, the more desirable it will be inasmuch as less effort will be necessary to remove lint. For this reason any non-linting agent which will not affect the cleaning properties of the pyrophosphate may be employed in any appropriate quantity. For example, a solution or emulsion containing methyl cellulose or ethyl cellulose or polyvinyl acetate or the like may be sprayed upon the paper strip before or after treatment with the pyrophosphate. Or this solution or emulsion could contain the phosphate. Such a product could contain a few hundredths to a few tenths of one per cent of the lint suppressor. Also a dye may be used either with or without the lint retarder.

Not only may this invention be applied to paper towels, but it may be applied to other fabrics such as cotton cloth or the like. If cotton cloths are prepared which are to be used repeatedly, it will be necessary to increase the content of the pyrophosphate, for example to between about 0.1% or 1%, and it may also be necessary to increase the content of the lint-reducing agent if such an agent is required and if the cotton cloth offers lint-forming properties kindred to those of paper towels.

In addition to the phosphate, it is often also desirable to incorporate a small proportion, e. g. 0.02% to 0.1%, of a wetting agent in the towel to leave a residual trace of the wetting agent on the glass. Such wetting agents include the relatively non-alkaline, non-haze-forming compounds such as the alkyl esters of sulfonated bicarboxylic acids especially the dioctyl ester of sodium sulfo-succinate known as "Aerosol OT" produced by the American Cyanamid and Chemical Corporation, under Patent No. 2,028,091, and the alkylated aryl sulfonates or salts of a homologous series of substituted sulfonic acids known as "Santomerse #3," produced by the Monsanto Chemical Company.

These disclosures are to be taken as illustrative of the generic invention claimed, rather than as limiting.

I claim:

1. A fabric towel adapted for cleaning glass surfaces containing between about 0.01% and 0.2% by weight of a salt of the class consisting of tetrasodium and tetrapotassium pyrophosphates, the towel being substantially free from materials which would present non-drying characteristics or leave film-forming or haze-forming residues.

2. A towel according to claim 1 containing a minor proportion of a lint suppressor.

3. A paper towel adapted for cleaning automobile windshields and the like containing between about 0.01% and about 0.2% of a salt of the class consisting of tetrasodium and tetrapotassium pyrophosphates, the towel being substantially free from materials which would present non-drying characteristics or leave film-forming or haze-forming residues.

4. A paper towel according to claim 3 containing a minor proportion of a lint suppressor.

5. A paper towel according to claim 3 wherein the salt is tetrasodium pyrophosphate.

6. A paper towel according to claim 3 wherein the salt is present in an amount between about 0.01% and about 0.1%.

7. A paper towel according to claim 3 wherein the salt is present in an amount between about 0.02% and about 0.05%.

8. A paper towel according to claim 3 wherein the salt is present in an amount between about 0.02% and about 0.05% and is tetrasodium pyrophosphate.

MARCELLUS T. FLAXMAN.